Patented June 15, 1954

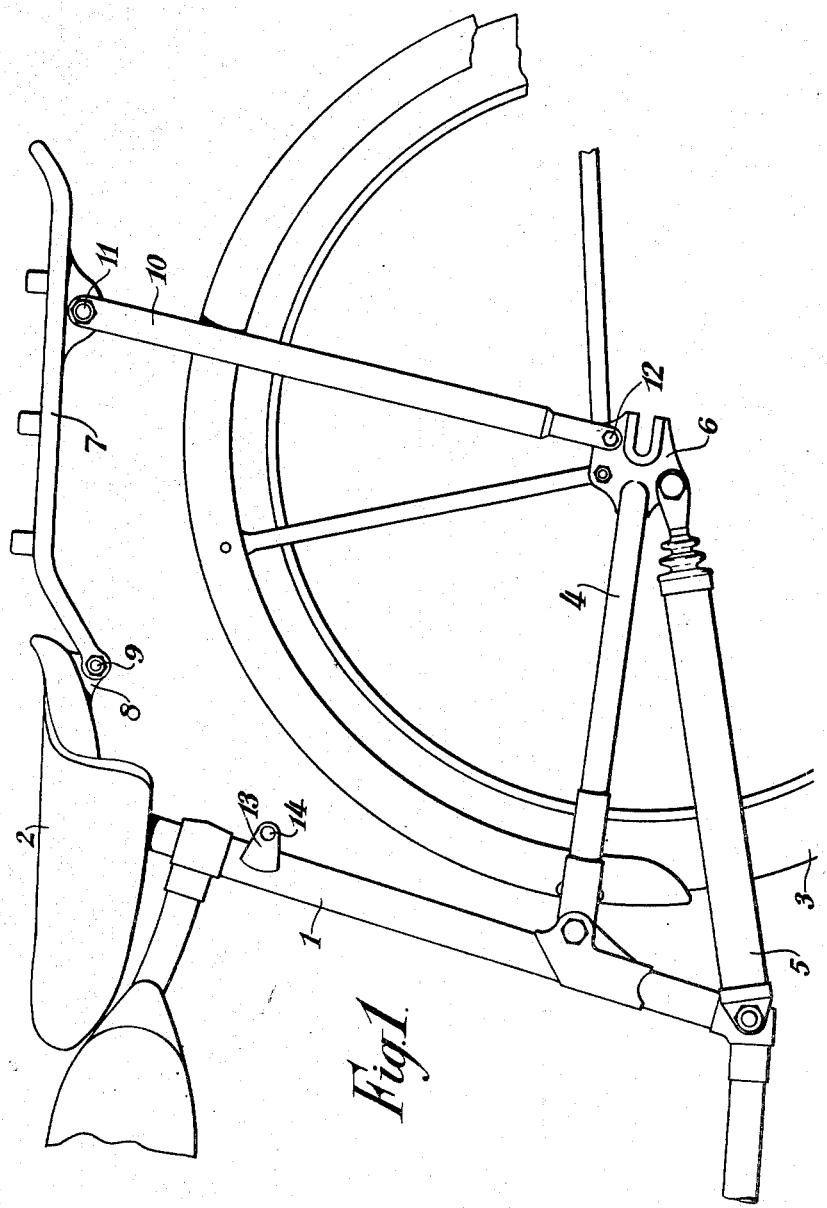

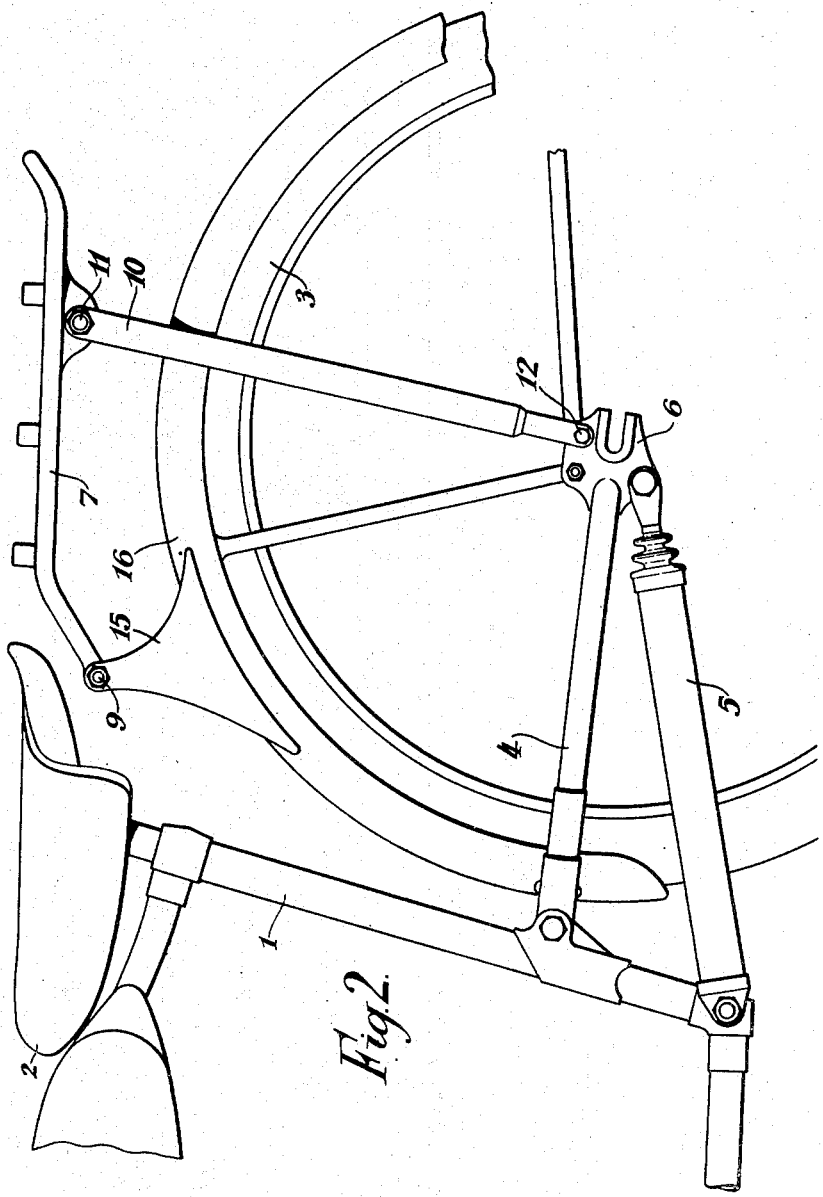

2,681,235

UNITED STATES PATENT OFFICE 2,681,235

MOUNTING FOR MOTORCYCLE PILLION SEATS

Robert Maxwell Seddon, Walmley, Sutton Coldfield, England, assignor to Dunlop Rubber Company Limited, London County, England, a British company Application October 25, 1950, Serial No. 191,957

3 Claims. (Cl. 280—283)

This invention relates to mountings for motor cycle pillion seats.

Pillion seats are usually rigidly supported on the rear axle and frame of a motor cycle, with the result that when a pillion passenger is carried the unsprung weight is increased very considerably. Consequently it is necessary to provide a much stronger frame than is required merely to carry the rider.

In my present invention I provide an improved pillion seat mounting whereby the frame and pillion seat are mounted resiliently on the rear wheel and the stresses on the frame due to a pillion passenger are considerably lower than those produced by rigid mountings under comparable conditions.

According to the present invention a motor cycle comprises a pillion seat pivotally supported at its front end on a rigid member attached to a frame carrying a resiliently mounted rear wheel and at its rear end on a resilient support attached to the rear wheel mounting.

Preferably the support comprises a pair of shock-absorbing devices connected to the rear wheel mounting on opposite sides of the wheel, each device comprising coaxial inner and outer telescopic members and an annular resilient element carried by the inner element and associated with means for subjecting it to compression on expansion or contraction of the device.

Also it is preferable that the rigid member is rigidly connected to the spring main frame of the motor cycle in a position adjacent the saddle. In such an arrangement it is advantageous to provide means whereby the resilient support can be detached from the rear wheel mounting and detachably connected to the main frame when the motor cycle is to be ridden with the pillion seat unloaded.

The various features of the invention are illustrated, by way of example, in the accompanying drawings in which Fig. 1 is a side view of a mounting for motor cycle pillion seats showing the manner of attachment of the seat to the frame and wheel support of a motor cycle, and Fig. 2 is a similar view of another embodiment of the invention.

The invention will now be described with reference to Figures 1 and 2 of the accompanying drawings which illustrate two different embodiments. In each embodiment the rear wheel of a motor cycle is shown as having a resilient suspension, but whilst such a suspension is preferable a mounting for a pillion seat in accordance with the invention may be employed on a motor cycle having a rigidly mounted rear wheel.

The rear frame member 1 of a motor cycle supports the saddle 2. The rear wheel 3 is resiliently mounted by means of a radius arm 4 and a shock absorber 5 disposed on each side of the wheel and connected to the frame member 1 and a reaction plate 6.

A lug 8 is fixed to the saddle frame and is thus rigidly connected to the main frame.

A pillion seat 7 is pivotally connected at its front end to the lug 8 by means of a bolt 9, and adjacent its rear end to two shock absorbers 10 by means of a bolt 11.

The shock absorbers 10 are disposed one on each side of the rear wheel and are pivotally connected at their ends remote from the pillion seat to the reaction plates 6 by means of a quick release fastener 12. The fastener 12 may comprise a bolt from which the nut may be unscrewed to permit removal of the bolt and placing it in a hole 14 of a lug mounted on the upper end of the frame member 1 and thus to support the shock absorber 10 from the lug 13.

Each shock absorber comprises co-axial inner and outer telescopic members and an inner annular resilient element carried by the inner member and associated with means for subjecting it to compression on expansion or contraction of the shock absorber. Shock absorbers of this construction are described in co-pending application Ser. No. 98,420 filed June 11, 1949.

The hole 14 is so located that when the shock absorbers 10 are swung about their bolt 11, the fasteners 12 can be aligned with and fastened in said hole. Thus if the motor cycle is to be ridden with the pillion seat unloaded the shock absorbers 10 may be disconnected from the reaction plates 6 and connected to the lug 13. This is particularly advantageous in the case of a motor cycle with a resilient rear wheel suspension, for, whereas the shock absorbers have the properties required to give comfortable riding for a pillion passenger, excessive vibration of the pillion seat may occur if it is unloaded and if its resilient support cannot be disconnected from the resilient wheel suspension.

In the embodiment shown in Figure 2 the pillion seat is pivotally connected at its front end by means of the bolt 9 to a bracket 15 which is secured to the rear mudguard 16 of the motor cycle. The rear end of the pillion seat is supported by shock absorbers 10 as herein described.

Having described my invention what I claim is:

1. A motor cycle which comprises a frame and saddle, a resilient mounting on said frame for a rear wheel, a pillion seat pivotally mounted at its front end on the frame of the motor cycle, a resilient support pivotally attached at its upper end to the rear end of the pillion seat and detachably secured at its lower end to the rear wheel mounting and a lug secured to the motor cycle frame to which the lower end of the resilient support may be secured when detached from the rear wheel mounting.

2. The motor cycle of claim 1 in which the front end of the pillion seat is attached to the saddle of the motor cycle.

3. A motor cycle according to claim 1 wherein the resilient support comprises a pair of shock absorbing devices disposed one on each side of the rear wheel.

References Cited in the file of this patent

UNITED STATES PATENTS

| Number | Name | Date |
| --- | --- | --- |
| 1,045,220 | Turner | Nov. 26, 1912 |
| 1,050,722 | Duckworth | Jan. 14, 1913 |
| 1,095,172 | Stoll | Apr. 28, 1914 |
| 1,148,707 | Morley | Aug. 3, 1915 |
| 1,317,378 | McEnroe | Sept. 30, 1919 |
| 1,331,747 | Fisker | Feb. 24, 1920 |
| 1,470,301 | Tappen | Oct. 9, 1923 |
| 1,508,107 | Lillesoe | Sept. 9, 1924 |